United States Patent [19]

Staiert et al.

[11] 4,332,127
[45] Jun. 1, 1982

[54] COMBINE FEEDER DRIVE CONTROL

[75] Inventors: Richard W. Staiert, Geneseo; Eugene J. Krukow, Cordova, both of Ill.

[73] Assignee: International Harvester Co., Chicago, Ill.

[21] Appl. No.: 196,993

[22] Filed: Oct. 14, 1980

[51] Int. Cl.³ .............................................. A01D 75/18
[52] U.S. Cl. .............................. 56/10.2; 56/DIG. 15; 130/27 H
[58] Field of Search .............. 56/10.2, 10.3, DIG. 15; 130/27 H; 318/327, 565, 490

[56] References Cited

U.S. PATENT DOCUMENTS

| 3,576,485 | 4/1971 | Coons | 318/327 |
| 3,906,322 | 9/1975 | Hirao | 318/464 |
| 3,910,286 | 10/1975 | Phoenix et al. | 56/10.2 |
| 4,030,012 | 6/1977 | Buhler | 318/565 |
| 4,193,248 | 3/1980 | Gilleman | 56/10.2 |

FOREIGN PATENT DOCUMENTS 140695  3/1980  Fed. Rep. of Germany ....... 56/10.2

Primary Examiner—Robert A. Hafer
Attorney, Agent, or Firm—F. D. Au Buchon; N. C. Johnson

[57] ABSTRACT

A self-propelled combine for harvesting a crop and including a crop threshing and separating mechanism and a feeder for feeding crop material into the threshing and separating mechanism. The feeder has an electro-hydraulic control system for engaging and disengaging drive to the feeder. An electronic control system monitors the speed of the feeder drive and actuates the electro-hydraulic control system to disengage the feeder drive in response to sensing feeder drive speed below a predetermined minimum.

7 Claims, 3 Drawing Figures

COMBINE FEEDER DRIVE CONTROL

BACKGROUND OF THE INVENTION

1. Field of the Invention

The invention relates generally to crop harvesting combines and more particularly to an automatic control of the power drive to the feeder of a combine.

2. Prior Art

The ingestion of a rock or an unusually large slug of crop material can damage the crop feeder or threshing mechanism of a combine. Moreover, a disruption of the material flow through the feeder can cause the material to build up at the feeder throat which can damage components of the crop harvesting header. The typical crop feeder includes a slip clutch in the power drive train operative to stop power drive to the feeder when the feeder is jammed with crop material or a foreign object. Slip clutches however, are subject to wear in normal use and require adjustment. Moreover, the slip clutch can be damaged through excessive slippage due to an undetected stoppage of the feeder.

U.S. Pat. No. 3,805,798 addresses one aspect of machine protection wherein the presence of rocks is detected and the feeder drive is interrupted. The passage of rocks or other objects mixed with the crop material induces a vibration in the header. An electronic detection device senses the vibration and stops the drive to the header and feeder. However, the system of this patent is effective only as a rock detector since the vibrations induced by crop material alone have low frequencies producing voltages which are filtered out. Accordingly, this system would appear to be ineffective to stop feeder drive in response to a slug or build up of crop material per se.

U.S. Pat. No. 2,749,696 shows a mechanical system for stopping power drive to a header and feed rake if the cylinder speed is reduced because of crop jamming therein. A centrifugal clutch 23 disengages drive to the sickle, header and feed rake when the speed of the cylinder allows the weight 49 in the clutch to move inwardly against centrifugal force. The drive disengaging speed of the cylinder can be selected by moving the weights to the various positions on the respective supporting arms 45.

U.S. Pat. Nos. 3,897,677 and 3,910,286 relate to threshing systems wherein the speed of the threshing cylinder is monitored or controlled. In both of these patents the concern is with jamming of the threshing cylinder. In very general terms, these patents show circuits which produce warnings or effect "controls". Neither of these patents is concerned with control of a feeder drive.

SUMMARY

The invention provides an electronic control system for disengaging power drive to a combine feeder in response to sensing the speed of the feeder. The control system compares the feeder speed with a predetermined minimum reference speed and generates a signal to stop the power drive to the feeder when the feeder speed drops below the reference speed. The reduction in feeder speed can be caused by the ingestion of rocks or a slug of crop material into the feeder. The system automatically shuts down the feeder enabling the operator to remove the rocks or crop slugs and thereby prevent damage to the feeder or components of the header and drive systems.

DESCRIPTION OF THE PREFERRED EMBODIMENT

Figure 1:
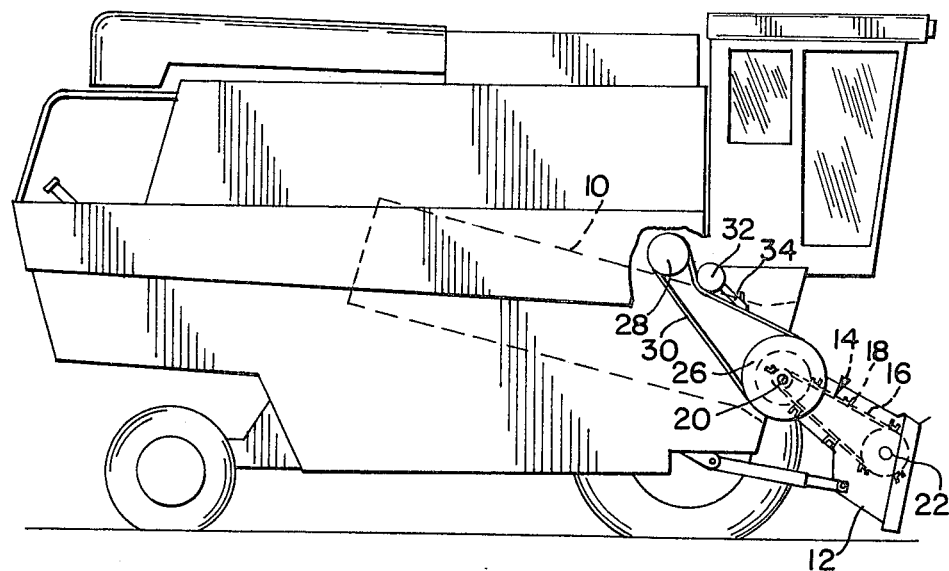
Figure 2:
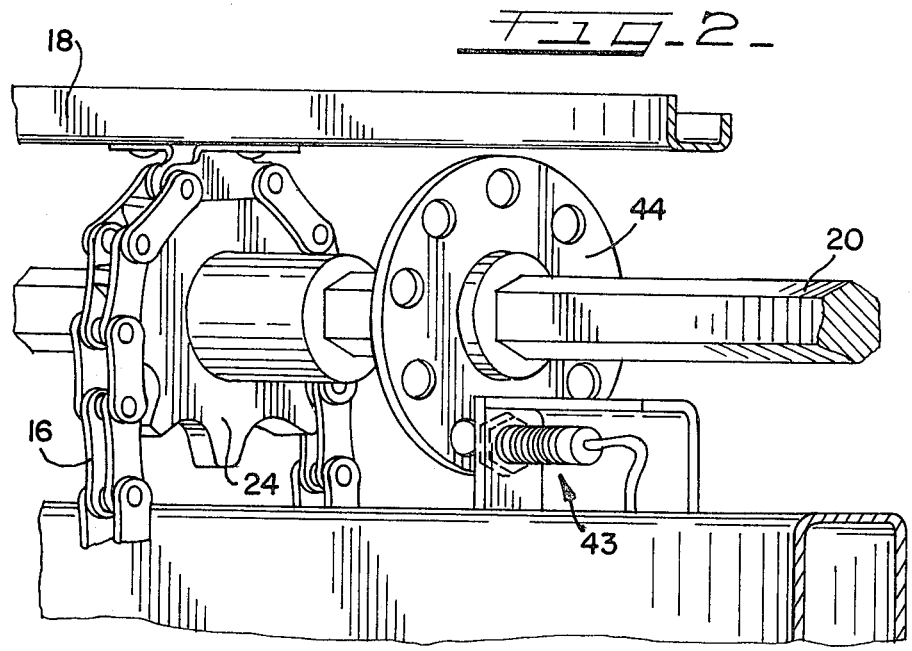

Referring first to FIG. 1, there is shown a self-propelled combine having an axial flow type threshing mechanism denoted generally at 10. A feeder housing 12 is pivotally mounted on the front of the combine and upon which a crop harvesting header (not shown) is adapted to be mounted for cutting and/or gathering the crop. Within the housing 12 is an endless feeder 14 having a pair of chains 16 upon which are mounted a plurality of crop conveying channel members 18. The chains 16 are trained about an upper drive shaft 20 and a lower driven shaft 22 by means of suitable sprockets one of which being shown at 24 in FIG. 2 mounted on the drive shaft 20.

Power is transmitted to the feeder 14 from the combine engine (not shown) by means including a pulley 26 mounted on the drive shaft 20, a pulley 28, and a belt 30 trained about the pulleys.

Figure 3:
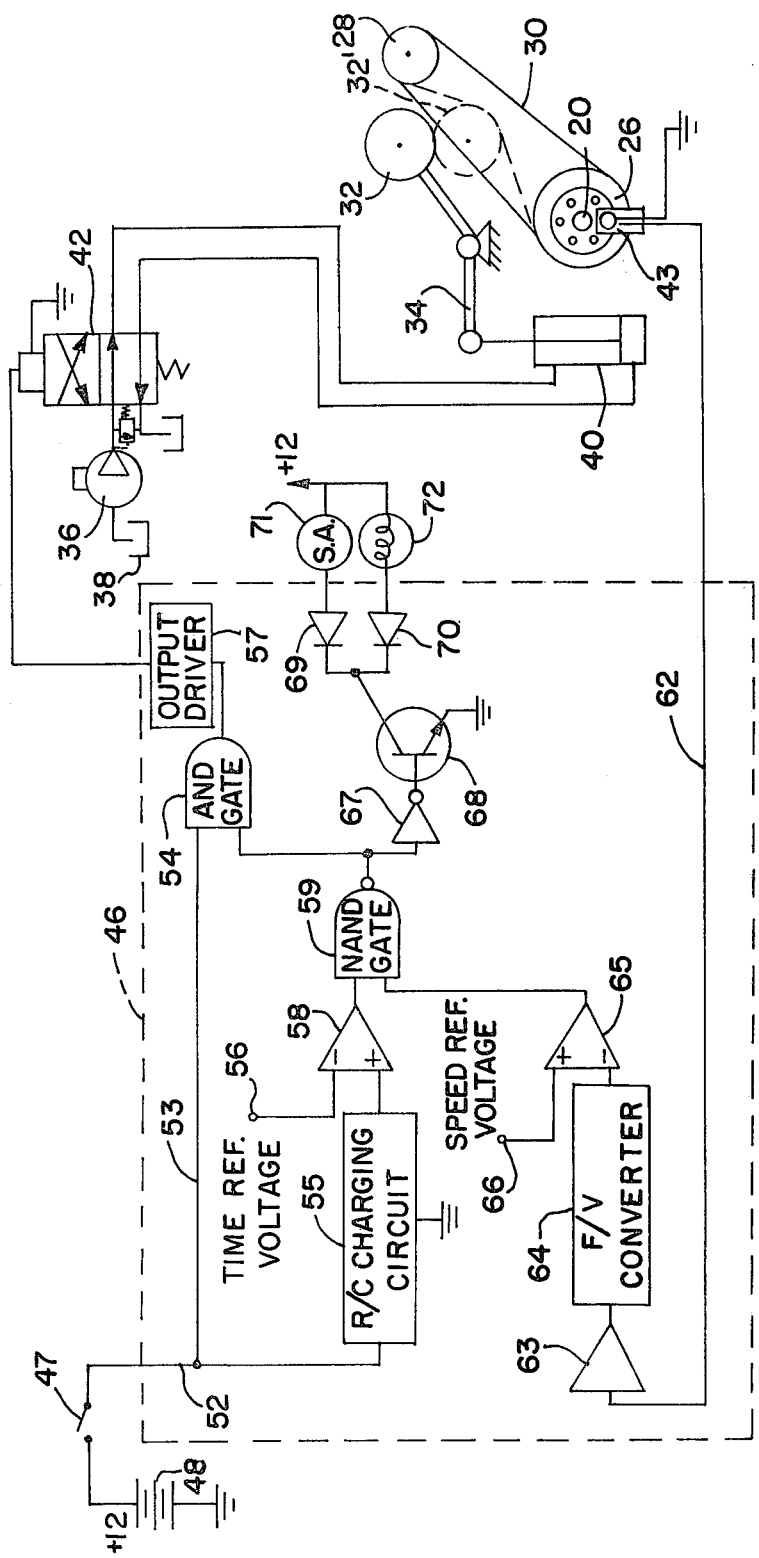

Power drive to the feeder 14 is engaged and disengaged by systems shown schematically in FIG. 3. An idler pulley 32 is journalled on an arm 34 pivotally mounted on the combine for engagement with the feeder drive belt 30. The idler pulley 32 is moved into and out of engagement with the belt 30 by a hydraulic system including a pump 36 drawing hydraulic fluid from a sump 38 and delivering the fluid under pressure to a double acting cylinder 40 connected to the arm 34. A two-position solenoid valve 42 is interposed between pump 36 and cylinder 40 to direct pump output to either the piston end of the cylinder 40 to move the pulley 32 into engagement with belt 30 (dotted line position 32') or to the rod end of the cylinder 40 to move the pulley 32 out of engagement with the belt 30.

The invention includes an electronic control system 46 for controlling the drive of the feeder 14 as shown schematically in FIG. 3.

The inventive feeder drive cut-off control system 46, as shown in FIG. 3, receives an input from a shaft speed sensing device and provides the necessary control logic circuitry to disengage the feeder drive when the feeder shaft 20 is sensed to be rotating at less than a selected operating speed. The speed of shaft 20 may be sensed using a transducer 43 including a transducer wheel 44 mounted for rotation with the shaft 20. As will be described in detail hereinbelow, if the speed of shaft 20 is below a selected rate, the current to the solenoid valve 42 is interrupted, causing the idler pulley 32 to be disengaged from belt 30, to cause belt 30 to stop and thus permit the blockage to be removed. After removing the blockage, the feeder drive may be reenergized by toggling a feeder clutch switch 47, that is by opening and then closing the switch 47. This action will cause the solenoid valve 42 to be reenergized to actuate cylinder 40 to move pulley 32 into engagement with belt 30.

Closure of feeder clutch switch 47 initiates operation of the system 46. Switch 47 couples a D.C. signal such as from a battery 48 through leads 52 and 53 to a two-input And gate 54; and, through lead 52 to an RC charging circuit 55. Circuit 55 is a conventional resistor-capacitor (RC) charging circuit which charges to a selected potential in about five seconds and functions as a time delay for purposes to be described. The output of the circuit 55 is coupled to the non-inverting input terminal of a conventional comparator amplifier 58. A second input to the comparator 58 is coupled to its inverting input terminal as a selected time reference voltage, indicated at 56.

As mentioned, when switch 47 closes, the RC circuit 55 charges to a selected level in about five seconds; this voltage is compared with the time reference voltage 56 by the comparator 58. The output of comparator 58 will be relatively low or (−) level until such time as the RC circuit 55 charges to the selected level, at which time the output of comparator 58 will go relatively high or (+) level; thus comparator 58 functions as a time delay comparator. The output of the comparator 58 is coupled as one input of a two-input Nand gate 59.

Refer now to the lower right hand corner of FIG. 3 which shows a reluctance transducer 43, which may be of any suitable known type, and which provides an electrical signal having a frequency dependent on the speed of rotation of the transducer wheel 44 mounted on the drive shaft 20. The signal from transducer 43 is coupled through a lead 62 to an operational amplifier 63. The output of amplifier 63 is coupled to a frequency-to-voltage converter 64, of suitable known type, which, as the name implies, provides a voltage output which is directly proportional to the frequency signal received from the transducer 43, which as mentioned, is proportional to the speed of shaft 20. The output of converter 64 is coupled to the inverting input terminal of a comparator amplifier 65 which functions as a speed comparator. A second input to comparator 65 is a reference voltage 66 coupled to the non-inverting input terminal of comparator 65 as a selected speed reference voltage.

The output from speed comparator 65 switches to a low or (−) level when the voltage from the converter 64 exceeds the selected speed reference voltage. That is, when the shaft 20 is operating properly and its speed of rotation is above a selected rate, the output from converter 65 is low or (−). When this occurs, that is when shaft 20 is operating properly, a low or (−) input is provided from converter 65 to Nand gate 59. As long as this input to Nand gate 59 is low or (−), and the input from the delayed time comparator 58 is high or (+), Nand gate 59 will provide a high or (+) output to And gate 54; and in turn, And gate 54 will provide a high or (+) output which will cause output driver 57 to continue to energize the solenoid valve 42 causing cylinder 40 to maintain the pulley 32 in contact with belt 30 and thus to continue to drive shaft 20.

Conversely, when the speed of the shaft 20 is below a selected rate, the speed comparator 65 provides a high or (+) output to Nand gate 59. When Nand gate 59 has two high or (+) inputs, that is, a high or (+) input from the speed comparator 65, and a high or (−) input from delay time comparator 58, it will provide a low or (−) output to And gate 54. At this point, And gate 54 will have a high or (+) input from switch 47, and a low or (−) input from Nand gate 59; accordingly, gate 54 will provide a low or (−) output to driver 57 which in turn will effectively deenergize the solenoid valve 42 to cause cylinder 40 to move pulley out of engagement with belt 30, and cause rotation of shaft 20 to stop.

Thus, when the output from the transducer 43 indicates the speed of shaft 20 is below a selected level; that is, that something is interfering with its rotation, the cut-off control system 46 will cause shaft 20 to stop rotating. Any rock or other impediment in the feeder system can then be removed.

The circuit of FIG. 3 also provides the operator with an audible and a visual indication of the slowing down or stoppage of the speed of shaft 20. Concurrently, as Nand gate 59 couples a low or (−) signal to And gate 54, Nand gate 59 will also couple a low or (−) output to an inverter amplifier 67 which will in turn provide a positive input to the base of an NPN switching transistor 68. Transistor 68 will thus be biased to conduct, and will complete a current path to ground for the parallel-connected audio device (horn) 71 and warning lamp (light bulb) 72. The current path for horn 71 extends from +12 volts through horn 71, a diode 69 and the collector to emitter electrodes of transistor 68 to ground. A current path from the +12 volts extends through lamp 72, a diode 70 and collector to emitter of transistor 68 to ground.

After the rock or other impediment in the feeder system has been removed, the cut-off control system 46 may be reactivated, and drive of belt 30 and shaft 20 reinitiated as follows:

The operator toggles switch 47; that is, switch 47 is opened for a brief interval and then reclosed. Opening of switch 47 causes the RC charging circuit 55 to discharge thereby providing a low or (−) input to comparator 58 which in turn will provide a low or (−) input to Nand gate 59. At this point in time, the shaft 20 is stopped hence the output of speed comparator 65 is at a high or (+) level. The low or (−) input from comparator 58 and the high or (+) input from comparator 65 cause Nand gate 59 to provide a high or (+) input to And gate 54. The other or second input to And gate 54 will be high or (+) when switch 47 is closed, thereby causing And gate 54 to provide a high or (+) voltage to enable output 57 to provide an input to solenoid valve 42 to cause cylinder 40 to activate pulley 32 to contact belt 30.

As soon as switch 47 is reclosed, RC circuit 55 starts to charge; and as mentioned above, circuit 55 takes five seconds to charge to its full value. When circuit 55 charges to its full value, the output of comparator 58 will go positive; and if the shaft 20 has not attained its proper operating speed the control system 46 will again disengage the drive. This provides a time delay of five seconds to allow shaft 20 to increase its speed above the selected rate. When shaft 20 is rotating above the selected rate, the output from speed comparator 65 will to (−). After the five seconds time delay, comparator 58 provides a (+) input to Nand gate 59; however, by this time shaft 20 should be rotating at the selected speed and speed comparator 65 will provide a low or (−) voltage to Nand gate 59 indicating shaft 20 is rotating properly. Accordingly, And gate 54 will have a high or (+) input from switch 47 and high or (+) input from Nand gate 59 and will provide a high or (+) voltage to driver 57 to energize solenoid 42 (and thus cylinder 40) to the belt driving mode as described above.

If after five seconds the speed of shaft 20 has not increased above the selected level, the input to Nand gate 59 from time delay comparator 58 will be (+) and the input from speed comparator 65 will be (+), thereby causing Nand gate 59 to provide a (−) input to And gate 54 which in turn causes output driver 57 to energize solenoid valve 42 to cause cylinder 40 to remove pulley 32 from belt 30. Thus, the control system 46 provides a five second delay to permit the shaft 20 to regain its minimum desired speed.

The input and output signals to and from the control logic circuit of FIG. 3 may be coupled electrically in series with the main feeder drive circuitry. Such connection provides fail-safe operation for the feeder drive in that it allows the feeder cut-off control system 46 to be bypassed by electrically disconnecting the system 46, and reconnecting the basic feeder drive circuit leads to one another, should the automatic system 46 become defective for any reason.

While the invention has been particularly shown and described with reference to a preferred embodiment thereof, it will be understood by those skilled in the art, that various changes in form and details may be made therein without departing from the spirit and scope of the invention.

What is claimed is:

1. In a combine for harvesting and threshing a crop, comprising:
    a feeder for feeding crop material into the combine, said feeder including a conveyor having a drive shaft;
    a drive system for the feeder including a belt drive to said drive shaft and an idler pulley movable to engage or disengage power drive to said drive shaft;
    means for moving said idler pulley between drive engaging and disengaging positions including a hydraulic cylinder operably connected to said idler pulley and a control valve for selectively actuating said cylinder;
    and electronic control means for sensing the rotational speed of said drive shaft, comparing the rotational speed to a predetermined reference speed, and generating a signal to actuate said control valve when the rotational speed becomes less than said reference speed whereby power drive to the feeder is stopped to protect the feeder under extraordinary loads.

2. In a combine having a threshing mechanism and a feeder for feeding crop material into the threshing mechanism, the improvement comprising:
    a power drive for the feeder including a feeder drive shaft,
    and electronic control means for disengaging said power drive in response to sensing a rotational speed of said shaft below a predetermined reference speed, said electronic control means further including switch means closeable to energize said system, and delay means for delaying the operation of the circuit for a selected period of time after closure of said switch to allow the shaft to reach a desired operating speed before control is effected.

3. In a combine having a threshing mechanism and a feeder for feeding crop material into the threshing mechanism, the improvement comprising:
    a power drive for the feeder including a feeder drive shaft,
    and electronic control means for disengaging said power drive in response to sensing a rotational speed of said shaft below a predetermined reference speed, said electronic control means further including switch means for providing a D.C. signal, means for developing a voltage proportional to the speed of rotation of said shaft, means for providing a speed reference voltage, first comparing means for comparing said voltage proportional to the speed of rotation and the speed reference voltage and providing an output representative thereof, charging voltage means chargeable to a selected level within a preset time, means for providing a time reference voltage, second comparing means for comparing said time reference voltage with the voltage on the charging means and providing a selected output representative thereof, first gate means for logically processing the output of said first and second comparing means and providing an output representative thereof, drive control means, and second gate means for receiving the ouput from said first gate means and said switch means and providing an output to actuate said drive control means dependent thereon.

4. An electronic control circuit as in claim 3 wherein said charging voltage means comprises an RC circuit which functions as a time delay means, and wherein said switch means is actuable to an open position to discharge said RC circuit and recloseable to initiate recharging of said RC circuit to initiate the timing period thereof.

5. An electronic control circuit as in claim 3 wherein said first gate means comprises a Nand gate, said second gate means comprise an And gate, and wherein said And gate energizes said drive control means in response to the shaft rotational speed being above a selected level.

6. An electronic control circuit as in claim 3 further including audible responsive means actuable when said drive means is interrupted, and visual means connected electrically in parallel with said audible means.

7. An electronic control circuit as in claim 3 wherein the means for developing a voltage proportional to the speed of rotation of said shaft includes a frequency to voltage converter receiving a signal from a reluctance transducer.

* * * * *